Figure 1:
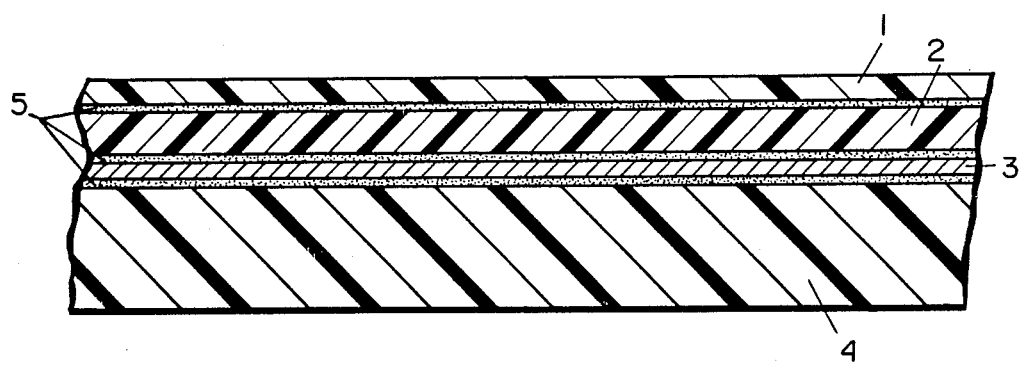

United States Patent [19]

Rantanen

[11] Patent Number: 4,874,656
[45] Date of Patent: Oct. 17, 1989

[54] MULTI-LAYER PACKAGING MATERIAL

[75] Inventor: Veikko O. Rantanen, Kauttua, Finland

[73] Assignee: A. Ahlstron Corporation, Karhula, Finland

[21] Appl. No.: 186,854

[22] Filed: Apr. 27, 1988

[51] Int. Cl.⁴ .................... B32B 27/06; B32B 27/08
[52] U.S. Cl. ............................ 428/216; 428/424.4; 428/424.2; 428/425.8; 428/461; 428/483; 428/910; 206/524.2
[58] Field of Search ............... 928/910, 216, 461, 483, 928/425.8, 424.2, 424.4, 516

[56] References Cited

U.S. PATENT DOCUMENTS 3,343,663 9/1967 Seidler .................................. 206/46
4,452,846 6/1984 Akao ................................... 428/516

Primary Examiner—P. C. Ives
Attorney, Agent, or Firm—Nixon & Vanderhye

[57] ABSTRACT

This invention provides a strong multi-layer packaging material having a high mechanical resistance and an impermeability to gases and vapors. It comprises at least the following layers:
(1) an outer layer of polyester
(2) a first inner layer of oriented polypropylene affixed to the polyester layer
(3) a second inner layer of metallic foil affixed to the oriented polypropylene layer
(4) an outer layer of polyethylene affixed to the metallic foil layer and between said layers are layers of adhesive.

15 Claims, 1 Drawing Sheet

MULTI-LAYER PACKAGING MATERIAL

The present invention relates to multi-layer laminates for packaging, having a high mechanical resistance and an impermeability to gases and vapors.

In general, materials for packaging must possess a complex of characteristics depending on their use. In many cases such materials must be able to withstand misuse and rough treatment. The materials should also be able to protect a packed product from gases and moisture of the outside atmosphere.

It is the object of the present invention to provide a new packaging material which satisfies the foregoing requirements. In accordance with the invention a multi-layer packaging laminate is characterized that is comprises at least the following layers:

(A) an outer layer of polyester
(B) a first inner layer of oriented polypropylene affixed to the polyester layer
(C) a second inner layer of metallic foil affixed to the oriented polypropylene layer
(D) an outer layer of polyethylene affixed to the metallic foil layer and between said layers are layers of adhesive.

The laminate layers have been chosen in such a way that the most economical choice of materials and method of production is obtained as well as a sufficient resistance for withstanding the treatment they may be subjected to in the intended uses. The order of the layers has also been chosen to optimize the puncture resistance of the laminate against the forces coming both from outside and inside.

The invention is more specifically described below by way of example, with reference to the accompanying FIG. 1 which is a cross sectional view through part of a laminate. Layer 1 is a layer of polyester, layer 2 is a layer of oriented polypropylene, layer 3 is a layer of metallic foil and layer 4 is a layer of polyethylene. These layers are attached to each others by layers of adhesive 5.

The dimensions of the laminate can vary within fairly wide limits. However the laminate must be sufficiently thin to permit such to be used for packaging, yet on the other hand sufficiently thick to have sufficient mechanical resistance for possible subsequent rougher treatment. Preferably the total thickness of the laminate according to the present invention varies from 106 $\mu$m to 212 $\mu$m.

Polyester layer 1 in general comprises polyethylene terephthalate. The thickness of this layer is preferably 12-24 $\mu$m.

Oriented polypropylene layer 2 essentially consists of isotactic macromolecules the melt index of which ranges from 0.5 to 5. Polyprolyene is manufactured by blown extrusion method, whereby the mechanical properties are similar in both longitudinal and transversal directions. The thickness of this layer is preferably 20-40 $\mu$m.

Metal foil layer 3 may comprise any of the metal foils known in the art, such as aluminium, silver or copper. Aluminium is preferred in use for reasons of convience and price. These foils preferably have a thickness of 9-18 $\mu$m.

Polyethylenes of various densities and film thicknesses can be used as the external layer 4. The polyethylenes have a thickness of 65 to 130 $\mu$m.

The laminates according to the present invention are produced preferably by laminating the films to each other by employing an adhesive between the layers. The adhesive layers have been chosen to withstand extreme conditions:high heat and moisture. The adhesive is usually one component or two-component polyurethane. It is applied 1 to 10 g/m$^2$, preferably 2.5 g/m$^2$.

The laminates according to the present invention have a very good resistance to perforation and impermeability to oxygen and water vapor. Therefore they have a considerably wide scope of use. They are particularly suitable for packaging of guns, missiles, shells and fuses. They can also be used as a cover for machines, devices and spare parts. Products of the electronic industry, such as circuit cards, can also be packed in these laminates.

The following example further illustrates the present invention, yet not limiting the scope of the invention.

Example:

One side of a 20 $\mu$m thick oriented polypropylene film is corona treated and laminated against a 12 $\mu$m thick polyethyleneterephthalate film. As an adhesive is used a 2-component polyurethane which is deposited on the film 2.5 g/m$^2$.

The polypropylene side of this laminate is further laminated to the bright face of the aluminum foil (thickness of 9 $\mu$m) and then the mat face of this foil adhered against the treated face of a polyethylene film (thickness of 65 $\mu$m). The adhesive between the layers is the same as above.

The characteristics of the laminate according to the example are shown in the following table. As a reference material is a 3-layer laminate. It is to be noted from the table that the laminate according to the present invention has considerably improved properties compared to those of the known laminate.

TABLE

Comparison of characteristics:

| 3-layer laminate PETP 12/AL 9/PE 70 | | TESTING method | 4-layer laminate PETP 12/OPP 20/AL 9/PE 0 65 |
|---|---|---|---|
| 111 | Scan P6:75 | g/m$^2$ | 127 |
| 95 | " P7:75 | mu | 112 |
| | | tensile strength KN/m | |
| 1,2 | " P16:76 | MD | 2,0 |
| 2,3 | | CD | 4,1 |
| | | elongation % | |
| 56 | | MD | 103 |
| 30 | | CD | 41 |
| | | puncture resistance N | |

TABLE-continued

Comparison of charactoristics:

| TESTING method | | | 3-layer laminate PETP 12/AL 9/PE 70 | 4-layer laminate PETP 12/OPP 20/AL 9/PE 0 65 |
|---|---|---|---|---|
| 88 | EP own method | from outside (PETP) | | 175 |
| 105 | " | from inside (PE) | | 213 |
| | Scan P29:69 | stiffness mN MD | | |
| 25 | | | | 49 |
| | | permeability to water vapor | | |
| 0,01 | ASTM E9680 (Permatran) | 38° C./90% RH g/m² × 24 h | | 0,01 |
| | | permeability to oxygen | | |
| 0,01 | ASTM D3985 (Oxtran) | 23° C./ 100% RH cm³/m² × 24 h | | 0,01 |

Abbreviations:
PETP = polyethyleneterephthalate
OPP = oriented-polypropylene
AL = aluminum foil
PE = polyethylene

What is claimed is:

1. A multi-layer laminate having a high mechanical resistance and an impermeability to gases and vapors, comprising at least the following layers:
   (A) a first outer layer of polyester having a thickness of about 12–24 μm;
   (B) a first inner layer of oriented polypropylene having a thickness of about 20–40 μm, affixed to the first outer layer of polyester;
   (C) a second inner layer of metallic foil having a thickness of about 9–18 μm affixed to the first inner layer of oriented polypropylene;
   (D) a second outer layer of polyethylene having a thickness of about 65–130 μm affixed to the second inner layer of metallic foil; and layers of adhesive between said first outer and first inner layers, between said first inner and second inner layers, and between said second inner and second outer layers.

2. A multi-layer laminate according to claim 1 wherein said polyester is polyethyleneterephthalate.

3. A multi-layer laminate according to claim 1 wherein said oriented polypropylene is manufactured by blown extrusion method.

4. A multi-layer laminate according to claim 1 wherein said metallic foil is aluminium foil.

5. A multi-layer laminate according to claim 1 wherein the adhesive is polyurethane.

6. A multi-layer laminate according to claim 1 wherein the adhesive is a two component polyurethane.

7. A multi-layer laminate having a high mechanical resistance and a impermeability to gases and vapors, said laminate consisting of:
   (a) a first outer layer of polyester;
   (b) a first inner layer of oriented polypropylene;
   (c) a second inner layer of metallic foil;
   (d) a second outer layer of polyethylene affixed to the metallic foil layer; and
   (e) a layer of polyurethane adhesive between said first outer and first inner layers, between said first inner and second inner layers, and between said second inner and second outer layers.

8. A multi-layer laminate according to claim 7 wherein the thickness of said polyester layer is 12–24 μm.

9. A multi-layer laminate according to claim 7 wherein the thickness of said oriented polypropylene layer is 20–40 μm.

10. A multi-layer laminate according to claim 7 wherein the thickness of said metallic foil is 9–18 μm.

11. A multi-layer laminate according to claim 7 wherein the thickness of said polyethylene layer is 65–130 μm.

12. A multi-layer laminate according to claim 7 wherein said polyester is polyethyleneterephthalate.

13. A multi-layer laminate according to claim 7 wherein said oriented polypropylene is manufactured by blown extrusion method.

14. A multi-layer laminate according to claim 7 wherein said metallic foil is aluminum foil.

15. A multi-layer laminate according to claim 7 wherein the adhesive is a two component polyurethane.

* * * * *